(12) United States Patent
Banister et al.

(10) Patent No.: US 6,621,892 B1
(45) Date of Patent: Sep. 16, 2003

(54) SYSTEM AND METHOD FOR CONVERTING ELECTRONIC MAIL TEXT TO AUDIO FOR TELEPHONIC DELIVERY

(75) Inventors: Scott Banister, Menlo Park, CA (US); Wendell Brown, Las Vegas, NV (US)

(73) Assignee: America Online, Inc., Dulles, VA (US)

( * ) Notice: Subject to any disclaimer, the term of this patent is extended or adjusted under 35 U.S.C. 154(b) by 101 days.

(21) Appl. No.: 09/616,492

(22) Filed: Jul. 14, 2000

(51) Int. Cl.[7] .............................................. H04M 11/00
(52) U.S. Cl. ................. 379/88.14; 379/88.17; 379/88.25; 455/412
(58) Field of Search .......................... 379/88.13, 88.11, 379/88.16, 88.17, 88.18, 93.24, 88.14; 455/412

(56) References Cited

U.S. PATENT DOCUMENTS

| | | | | |
|---|---|---|---|---|
| 5,475,738 A | * | 12/1995 | Penzias | 379/88.13 |
| 5,647,002 A | * | 7/1997 | Brunson | 379/88.18 |
| 5,987,508 A | * | 11/1999 | Agraharam et al. | 379/93.24 |
| 6,243,681 B1 | * | 6/2001 | Guji et al. | 455/412 |
| 6,246,983 B1 | * | 6/2001 | Zou et al. | 379/88.16 |
| 6,335,963 B1 | * | 1/2002 | Bosco | 379/88.11 |
| 6,353,852 B1 | * | 3/2002 | Nestoriak et al. | 379/88.17 |

* cited by examiner

Primary Examiner—Fan Tsang
Assistant Examiner—Gerald Gauthier
(74) Attorney, Agent, or Firm—Glenn Patent Group; Michael A. Glenn; Kirk D. Wong

(57) ABSTRACT

A system and method are provided for converting a textual portion of an electronic mail message into audio and delivering the audio through a telephone call to a recipient. An electronic mail server is configured to receive a mail message and parse an address to retrieve a telephone number included in or associated with said address. One or more textual portions of the mail message are converted to audio by a text-to-audio converter and combined into an audio message. The audio message may include an identifier of a sender or originator of the mail message, a subject of the mail message, text included in the body of the mail message, etc. An audio attachment included with the mail message may be included in the audio message. A call processor establishes a telephonic connection with the recipient, plays the audio message and may record a response from the recipient. If a response is provided, it is relayed back to the originator of the mail message. The recipient may be able to specify circumstances (.g., time of day, different telephone number) or criteria (e.g., originator identity, size of mail message) under which the recipient will or will not accept telephone delivery of audio forms of electronic mail messages. The system may apply a set of rules to ensure that audio forms of mail messages are limited, or not sent at all, to emergency numbers, directory assistance, toll-free numbers, etc.

22 Claims, 3 Drawing Sheets

SYSTEM AND METHOD FOR CONVERTING ELECTRONIC MAIL TEXT TO AUDIO FOR TELEPHONIC DELIVERY

BACKGROUND

This invention relates to the fields of computer systems and communications. More particularly, a system and methods are provided for converting an electronic mail message to audio for delivery via a telephone call.

Electronic mail can be an effective method of communicating information, but many users do not maintain continual connections with their electronic mail accounts. Therefore, a message may languish in a recipient's account or inbox for a significant period of time. As one alternative, the information could be communicated telephonically but then generally only one person at a time can receive the information. Each recipient must be separately notified.

In addition, telephone (e.g., voice) messages are static, so that whether the calling party reaches the intended recipient or leaves a message with the recipient's answering system, the calling party has only one chance to communicate the message clearly. Conversely, when the information is sent via electronic mail, the sender can review and revise the message before actually sending it.

Existing message delivery systems do not provide for the conversion of an electronic mail message into a voice message for delivery via telephone call. Although a text-to-speech converter may be available, present implementations require a user to first conduct an extended communication session with a specified entity (e.g., a world-wide web site) providing the text-to-speech conversion. The user may then be able to enter his or her text for conversion to a voice message, which may then be sent to a recipient telephonically after the user provides a phone number. This system is inflexible, however, and requires a user to connect to the site and enter one message at a time For one user. This system cannot accept electronic mail messages, particularly messages addressed to multiple users and would be very inefficient for sending one message to many recipients or many messages to any number of recipients.

What is needed then is a system and method for converting an electronic mail message into audio or voice form for telephonic communication to a recipient. Such a system may also allow for a confirmation message or response to be returned to the sender of the electronic mail message.

SUMMARY

In one embodiment of the invention a system and methods are provided for receiving an electronic mail message, retrieving a telephone number associated with an intended recipient of the message, converting one or more textual portions of the message (e.g., sender's identity, subject, body) to audio, establishing a telephonic connection with the recipient and playing an audio form of the message text.

If the received electronic mail message includes an audio attachment, it may be included in the audio message played for a recipient. In different embodiments of the invention the format of an audio attachment, the audio message played for a recipient, and the output of a text-to-audio converter may vary, and any such format may be altered or converted before being played for a recipient.

The address of the recipient may include the recipient's telephone number as a prefix, and the address need not be pre-registered or known on the electronic mail server that receives or processes the message. Alternatively, the mail server may maintain a list or database of addresses with associated telephone numbers, in which case a message sent to such an address will be converted to audio and forwarded to the specified number. An electronic mail address or prefix of an address may be run through a series of filtering rules to ensure that the sender of the message is not trying to have it delivered to restricted or prohibited numbers (e.g., an operator, emergency numbers, directory assistance, toll-free numbers, government offices).

A call processor receives the telephone number identified by the mail server, the output of the text-to-audio converter, and any audio attachment, establishes the telephonic connection with the recipient and plays the audio message (e.g., the converted text and/or audio attachment). The call processor may attempt to reach the recipient multiple times if the number is busy or the line is not answered. The audio message may be left on an answering system or directions for calling in and retrieving the audio message may be left.

In one embodiment of the invention a recipient may be able to provide a response to the audio message, which response may be recorded and returned to the sender of the electronic mail message. The response may be provided as a sound file or may be converted to text or other form prior to being returned.

DETAILED DESCRIPTION

Figure 1:
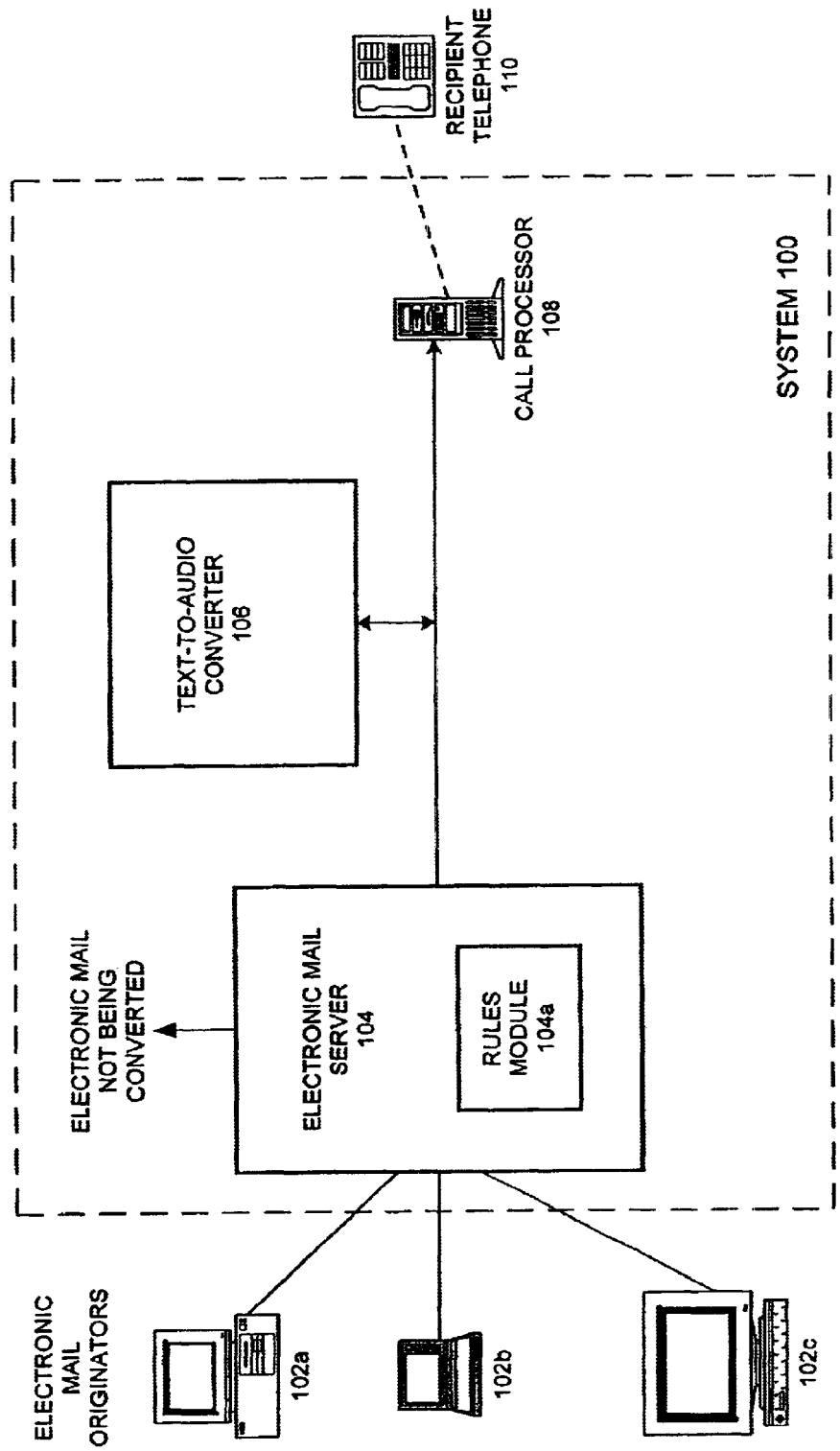
FIG. 1 is a block diagram depicting a system for converting an electronic mail into a voice message in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and method are provided for converting an electronic mail message into voice or audio format and delivering the message to a recipient via a telephone call. In this embodiment a sender of an electronic mail message addresses the message to an electronic mail server of an organization providing the conversion service. The prefix of the address may include the telephone number to which the resulting voice message is to be placed. In this embodiment the mail server is configured to accept the message and process it for conversion even if the prefix is not already known or registered on the server. Thus, without first establishing an electronic mail account or address for a recipient of the message, an electronic mail message can be sent using the recipient's telephone number as an address, and the electronic mail message will be converted to audio and telephonically communicated to the recipient.

In various embodiments of the invention a recipient may register his or her telephone number with the system and specify when calls may or may not be placed to him or her, provide an alternative telephone number to call with messages directed to the recipient's telephone number, and otherwise configure the system according to his or her desires. In one embodiment of the invention a recipient may provide an audio response to a message, which may be returned (e.g., in textual, audio or other form) to the sender of the original electronic mail message.

FIG. 1 depicts a system for converting an electronic mail message into an audio message for delivery via telephone according to one embodiment of the invention.

System 100 of FIG. 1 includes an electronic mail gateway or server 104 that receives electronic mail messages from electronic mail originators such as originators 102*a*, 102*b*, 102*c*. The mail server includes rules module 104*a*, which applies a set of rules or filters to determine whether a particular electronic mail message should be accepted for conversion or rejected, and possibly how to process or route the message. The system also includes text-to-audio converter 106 for converting the text of all or part of an electronic mail message to audio form, and one or more call processors (e.g., call processor 108) for placing calls to recipients' telephones. A first recipient of a converted electronic mail message is represented by recipient telephone 110, which may be a wired or wireless device capable of receiving audio information.

FIG. 1 depicts just one possible con figuration of a system for converting an electronic mail message to voice. Other possible systems may include different quantities of the components of system 10 and/or take other forms that may be derived from system 100.

Electronic mail originators may employ virtually any device capable of initiating or forwarding an electronic mail message, such as a computer, smart phone, two-way pager or other intelligent processor-equipped) device. An electronic mail message converted to text for telephonic delivery in a present embodiment of the invention includes one or more addresses and may include any number of other fields or components, such as a subject, body, attachments, hyperlinks, etc.

In one embodiment of the invention at least one address includes a telephone number. For example, an address may be similar to 6505551234@evoice.com, where "6505551234" is considered the prefix of the address and "evoice.com" identifies a domain of the electronic mail server. The manner in which an electronic message is converted, delivered or processed may, in a present embodiment of the invention, depend on the domain to which the message is directed.

The telephone number may be expressed with or without an area code (i.e., ten or seven digits), with or without a leading "1", in international format (i.e., starting with "011"), or any other recognizable format. The rules used to filter a telephone number address may depend on the format of the number (e.g., different rules may be applied for different area codes, countries, etc.).

In one alternative embodiment of the invention an address specified by an originator of a message may be converted to a telephone number or used to look-up a telephone number when the message is received at electronic mail server 104.

Although system 100 depicts a single electronic mail server, any number of mail or other servers may be employed to receive electronic mail messages and/or determine a telephone number to which a message should be telephonically delivered. In particular, multiple servers may be included in order to balance the load of processing messages. In addition, although server 104 receives electronic mail messages that are to be converted to audio, it may also be configured to receive "regular" messages, that is, messages that are not to be converted. Thus, one function of server 104 may be to distinguish messages to be converted from messages that are not to be converted.

Rules module 104*a* may be configured to process all electronic mail messages received at server 104 or just those messages that are candidates for being partially or fully converted to audio for telephonic delivery. In one embodiment of the invention a message received at server 104 is first examined to determine if any of its addressees include what may be a telephone number. If not, it is treated as a regular message. However an address that does not include a telephone number may be mapped to an address comprising a telephone number or some other address (e.g., a forwarding address) that is mapped to a telephone number.

An electronic mail message addressed to an address that does not include a telephone number, does not map to an address that includes a telephone number, and does not otherwise call for conversion of the message to audio format may be rejected unless the address is already registered or known on server 104. In other words, regular electronic mail messages may be accepted only for known users or accounts.

Conversely, however, if a message address includes a telephone number or otherwise calls for conversion to audio (e.g., the address maps to or is forwarded to an address including or associated with a telephone number), it may be accepted regardless of whether the address is already registered or known on server 104. Thus, an electronic mail message may be received, converted to audio and forwarded telephonically even if the prefix of an addressee of the message is unknown to the mail server.

The rules or filters used to separate regular electronic mail messages from messages to be converted to audio may be merged with the rules or filters applied by rules module 104*a* to determine whether to accept and convert a message. In one embodiment of the invention electronic mail server 104 (e.g., rules module 104*a*) may first determine whether a message received at the server is a candidate for conversion to audio. This determination may be made based on the form of an address, such as whether it is numeric or contains sufficient numerals to indicate a telephone number or whether the address is forwarded or mapped to a numeric address. Then, rules module 104a may apply its rules to determine whether to accept the message for conversion. In another embodiment rules module 104a may first apply its rules to determine whether to accept the message for conversion. In this embodiment, a message may be treated as a regular message if it fails one of the filters applied by the rules module.

Illustratively, rules module 104a parses an address of an electronic mail message received at server 104 to determine whether the message can or should be converted. In one embodiment of the invention the prefix of an address of a message to be converted must be numeric and ten or eleven digits in length (i.e., including an area code and possibly an initial digit of "1") for delivery within the United States. Longer addresses may be parsed and compared to telephone number formats for corresponding countries or regions. Prefixes or addresses beginning with "411," "911," or other restricted numbers or area codes may be ignored or deleted. Addresses comprising toll-free and directory other assistance numbers (e.g., "5551212") may also be rejected. As described below, in one embodiment of the invention a recipient may be able to customize how and/or when messages directed to his or her telephone number are or are not delivered telephonically.

A message having an address that passes the rules/filters applied by the rules module may then be passed to text-to-speech converter 106 if it includes text to be converted. Illustratively, for a message that does not include an attachment, the body of the message may be converted, along with any and/or all of the subject, originator and other fields. In different embodiments of the invention, an attachment may be ignored, may be converted if it contains text or may be passed directly to call processor 108 (e.g., without conversion) if it is in an audio format (e.g., if it is a file with an extension of. WAV, .RA, .MP3, etc.) or includes information in an audio format. In one embodiment of the invention, if an attachment is an audio file, then the body of the message may be ignored.

Illustratively, only the information to be converted from text to audio (e.g., originator identity (name and/or electronic mail address), subject, body) is passed from server 104 to converter 106. Any information not requiring conversion (e.g., telephone number, audio file attachment) may be passed directly to call processor 108 by server 104. Converter 106 converts textual information to an audio format that can be handled by call processor 108 or the audio output of the converter (and/or server 104) may be changed in format (e.g., from a .RA file to a .WAV file).

Call processor 108 uses a telephone number provided by server 104 to set up a call to a recipient having that telephone number. The call processor then plays the audio information received from electronic mail server 104 and/or text-to-audio converter 106 to the recipient. If the call is answered by an answering machine, the audio information may be played or, in one alternative embodiment the call processor may hang up and attempt another call to the recipient at a later time.

System 100 may, in one alternative embodiment of the invention, include multiple call processors, perhaps for different geographical regions or to balance the load of placing calls.

In one embodiment of the invention, after an audio message is played for a recipient, call processor 108 may record a response from the recipient. The response may be audio (e.g., voice) or may comprise the DTMF (Dual Tone Multi-Frequency) signals corresponding to keypad buttons pressed by the recipient (which may then be converted to some other form in order to identify the buttons). The response may then be converted back to text (e.g., by converter 106) and/or sent as an audio file in a return electronic mail message to the originator of the message played for the recipient.

The system may be configured to allow recipients to specify how and/or when electronic mail messages may be sent to them telephonically. One recipient may, for example, choose to reject all such messages. Another may specify that such messages may only be sent during certain hours, or that only messages meeting certain criteria (e.g., originator, subject, length, audio form of an attachment) may be sent, or that messages are to be forwarded to another telephone number, etc. Recipients may communicate their desires by connecting to the system via a network (e.g., the Internet), telephonically contacting a human representative of the system, or some other method.

In one embodiment of the invention different domains or sub-domains may be established in order to convert or complete messages in different ways. For example, messages having an address in one sub-domain may only be completed during daylight hours, another sub-domain may be configured to send audio messages directly to a recipient's voice mailbox, etc.

Figure 2A:
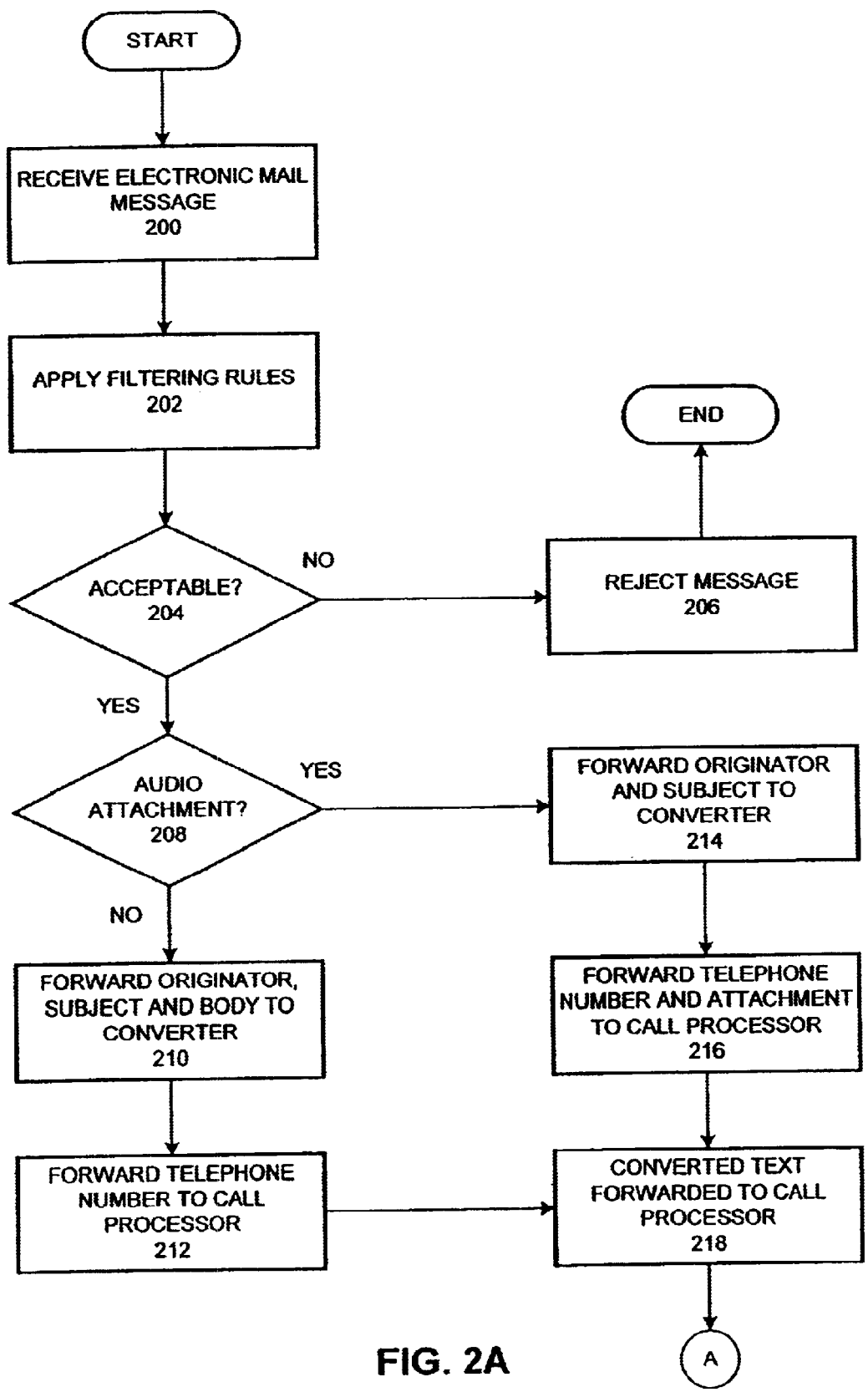
FIGS. 2A–B comprise a flowchart illustrating one method of converting text from an electronic mail message into audio and telephonically delivering the audio to a recipient in accordance with an embodiment of the invention.
Figure 2B:
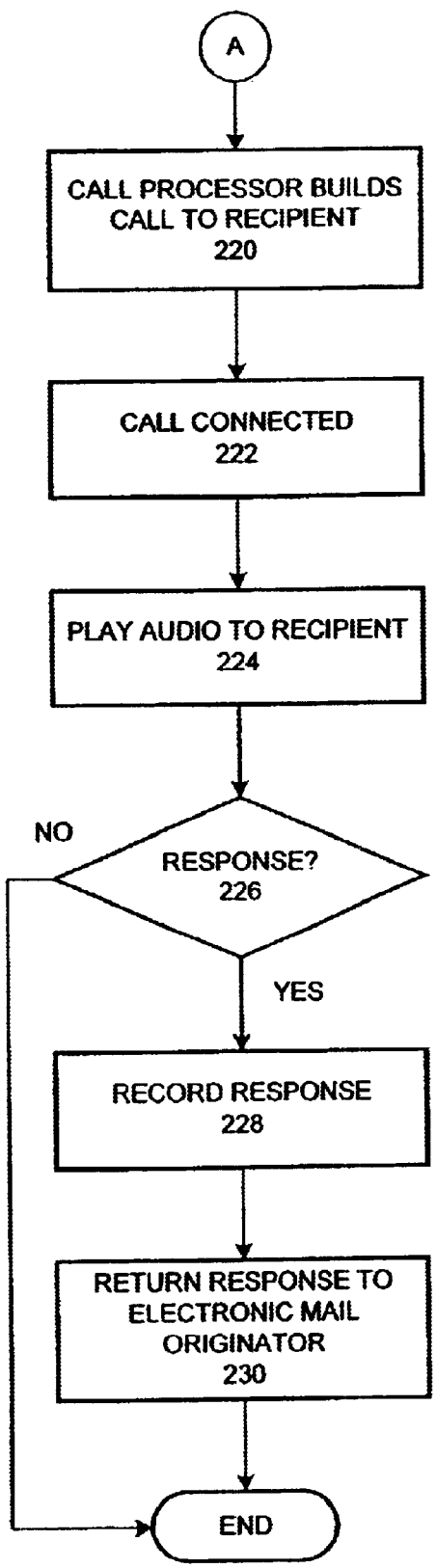

FIGS. 2A–B comprise a flowchart demonstrating one procedure for converting an electronic mail message to audio and delivering the audio message telephonically according to a present embodiment of the invention. This embodiment of the invention is suitable for operation with a system such as system 100 of FIG. 1. Prior to operation of the illustrated procedure, a recipient may connect to the system and specify, as discussed above, one or more parameters concerning the telephonic delivery of messages.

In state 200, an electronic mail message to be converted to audio and delivered telephonically is received at the system. In the presently described embodiment the system may examine incoming messages to determine if they are to be delivered normally (e.g., without being converted to audio). The system may examine the prefix of an address to which the message is directed and, for example, if the prefix contains no numerals or an insufficient number of digits to form a telephone number, it may be assumed that the message is to be delivered without any of its textual content being converted to audio (e.g., as a regular electronic mail message).

Messages received at the system for conversion to audio and delivery via a telephone call may include addresses in the form of prefix@domain, where the prefix may include multiple digits representing a telephone number. The digits may be numerals, alphabetic equivalents of the digits of a telephone number, or some combination of alphabetic and numeric characters. In one alternative embodiment the prefix may be used to look up a telephone number to which the message is to be sent. In one embodiment of the invention a message may be directed to multiple addressees. With multiple recipients, all of them may receive the message in the same form (e.g., with or without being converted to audio) or some may receive it as audio and some may receive it as electronic mail.

The system may use the prefix to search a list or database of registered accounts or users. The results of the search may indicate whether the message should be delivered without conversion. If the message is not to be converted, it is handled as a regular electronic mail message and may be forwarded to the addressee, a mail processor or gateway, etc. Otherwise, if the prefix of an address to which the message is directed seems to include a telephone number, or if an account for the address indicates that the message is to be converted to audio and delivered telephonically, the procedure continues at state 202.

In state 202 a set of rules is applied to determine if the prefix includes or is mapped to a telephone number to which an audio form of the message can or should be delivered. In different embodiments of the invention different rules may be applied to filter messages according to different criteria. The system may compare the form of the prefix or telephone number associated with the prefix to acceptable forms. In this manner the system can screen out calls to emergency numbers (e.g., numbers beginning with 911), directory assistance (e.g., 411, 555-1212), toll-free numbers, etc. The rules may block or allow messages directed to long-distance or international telephone numbers, may ensure that the number does not begin with zero unless it is an international number, may ensure that the number has a sufficient amount of digits, etc.

As one step of determining the acceptability of the telephone number, the system may determine whether a recipient associated with said telephone number has restricted use of the telephone number in delivering audio conversions of electronic mail messages. The recipient may have disallowed the delivery of converted messages to the number or restricted the times or manner in which such messages may be delivered.

In state 204 the system determines whether the prefix or telephone number satisfies the rules. If it is acceptable, the illustrated procedure advances to state 208. Otherwise, in state 206 the message is rejected for this prefix or addressee. If the message has no other addressees that may require conversion of the message to audio, then the procedure ends. Otherwise it may return to state 202 to apply the rules for another address or addressee.

In state 208 the system determines whether the message includes an audio attachment. If so, the procedure continues at state 214. An audio attachment may be identified by its file type (e.g., .WAV, .RA, .MP3).

In state 210, the message has no attachments in audio format, and so any attachments to the message are ignored and the originator (e.g., name and/or electronic mail address), subject and body of the message are passed to a text-to-audio converter for conversion to audio. In one alternative embodiment of the invention a textual portion of a non-audio attachment may be passed to the converter.

In state 212 the telephone number derived from the prefix of the message address or located by searching a database for the prefix is passed to a call processor. As described below, the call processor will use the telephone number to set up a call to the addressee. After state 212 the procedure continues at state 218.

In state 214, because the message includes an audio attachment the body of the message is ignored and some identifier of the originator (e.g., name, electronic mail address) plus the subject of the message are passed to the text-to-audio converter. In one alternative embodiment the body of the message may also be converted even if the message includes an audio attachment.

In state 216 the telephone number associated with the address, plus the audio attachment, are passed to a call processor. In one embodiment of the invention the format of an audio attachment may be changed (e.g., from .WAV to .RA).

In state 218 the converter converts the text received from the mail server into audio form and passes it to the call processor. The type of audio (e.g., .WAV, .RA) into which the text is converted may vary from one embodiment to another. In one embodiment the audio format produced by the converter may be changed before the final audio message is compiled and/or played for a recipient.

In state 220 the call processor builds and places a telephone call to the message addressee using the telephone number received from the mail server. If the recipient's telephone line is busy, or there is no answer, or an answering machine answers the call, the call processor may terminate the call and try again later. Alternatively, however, the call processor may leave the audio message on an answering machine. As another alternative, directions may be left on an answering machine concerning how to call into the system and retrieve the audio message.

Call processors may be distributed across large geographical areas, with the audio and converted text that are provided to a call processor being delivered via a wide-area network, local area network, Internet, intranet, etc. Thus, by using different call processors in different regions (e.g., identified by area codes), toll and long-distance charges may be reduced.

In state 222 the call is answered by the message addressee. The recipient may be prompted to accept delivery of the audio message (e.g., by voicing agreement or pressing a keypad button).

In state 224 the call processor plays an audio message including any or all of an identity of the originator of the electronic mail message, the subject of the message, the body of the message and an audio attachment.

The originator of the electronic mail message may be notified of the status of the audio message (e.g., whether it was delivered or not, how many attempts were made to deliver the message).

In state 226 the system determines whether the recipient desires to provide a response. This may be expressed by a voice statement or the entry of one or more keypad signals. If the recipient has no response to make, the illustrated procedure ends.

Otherwise, in state 228 the system records a response from the recipient, which response may be verbal or comprise one or more keypad signals. In state 230 the response is returned to the electronic mail message originator. The response may be sent as an audio file (e.g., a .WAV file) or may be converted to text. The procedure then ends.

In one embodiment of the invention the recipient may take other action in response to receiving the audio message. For example, depending on a voice command issued by the recipient or keypad button that is pressed, the recipient may be able to access his or her configuration settings (e.g., in order to change how/when electronic mail messages may be telephonically delivered to him or her), request the audio message be telephonically forwarded to or played for another person, respond to a product promotion or marketing message, etc.

FIGS. 2A–B illustrate just one procedure for converting an electronic mail message into audio and delivering it telephonically. Satisfactory alternative procedures for implementing an embodiment of the invention may be derived from the preceding discussion.

Organizations that currently send information to computer users via electronic mail may employ an embodiment of the invention to reach telephone users who may or may not use a computer or who do not have continual access to a computer. For example, an auction service that notifies bidders when they have won an auction or been outbid can notify bidders via telephone. An organization that uses electronic mail invitations to arrange events may use an embodiment of the invention to reach a larger audience. And, a recipient of a telephonically delivered message may be able to issue a response to be returned to the invitation organization.

Many Internet-based organizations use the Internet and electronic mail to send various types of other information (e.g., stock quotes, news articles, sports scores) via electronic mail. Such information may now be delivered telephonically without changing the manner in which the organization sends it. In other words, using an embodiment of the invention an information organization can simply add properly formatted electronic mail addresses to their information items and the items will be delivered via telephone.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of converting text from an electronic message to audio for delivery via telephone, comprising:

receiving an electronic message containing text;

retrieving a telephone number associated with an addressee of said electronic message;

applying a set of rules to determine the validity of said telephone number;

wherein said applying step parses said telephone number to ensure that said telephone number does not comprise any of: a restricted number, a toll free number, a directory assistance number, and an invalid area code;

converting said text to audio;

establishing a telephone connection with said addressee if said telephone number is valid; and delivering said audio through said telephone connection.

2. The method of claim 1, further comprising:

receiving a response from said addressee through said telephone connection; and transmitting said response to an originator of said electronic message.

3. The method of claim 1, wherein said retrieving comprises:

retrieving an address to which said electronic message is directed;

parsing said address to obtain a telephone number.

4. The method of claim 3, further comprising applying a set of rules to determine whether an audio form of said electronic message may be directed to said telephone number.

5. The method of claim 3, wherein said address to which said electronic message is directed is not a registered electronic mail address.

6. The method of claim 1, wherein said retrieving comprises:

examining an address to which said electronic message is directed; and retrieving a telephone number associated with said address.

7. A computer-implemented method of converting a textual portion of an electronic mail message to audio for delivery via a telephone connection, comprising:

receiving an electronic mail message at a mail server, wherein a first address to which said electronic message is directed is not registered on the mail server;

parsing said first address to identify a telephone number within said first address;

applying a set of rules to determine the validity of said telephone number;

wherein said applying step parses said telephone number to ensure that said telephone number does not comprise any of: a restricted number, a toll free number, a directory assistance number, and an invalid area code;

determining whether an audio form of said electronic mail message is authorized to be delivered to a telephone device having said telephone number;

converting a textual portion of said electronic mail message into an audio message;

establishing a telephone connection to said telephone device if said telephone number is valid; and transmitting said audio message over said telephone connection.

8. The method of claim 7, further comprising:

determining whether a recipient of said audio message wishes to provide a response to said audio message;

recording said response; and providing said response to an originator of said electronic mail message.

9. The method of claim 8, wherein said response is provided as an audio attachment to a return electronic mail message directed to said originator.

10. The method of claim 8, wherein said response is converted to text and sent to said originator in a return electronic mail message.

11. The method of claim 7, wherein said electronic mail message is also directed to a second addressee registered on said mail server, the method further comprising:

forwarding said electronic mail message to said second addressee.

12. The method of claim 7, wherein said parsing comprises:

examining a prefix of said first address; and extracting a series of numeric digits from said prefix.

13. The method of claim 7, wherein said converting comprises:

converting an identity of an originator of said electronic mail message into audio;

converting a subject of said electronic mail message into audio; and combining said audio of said originator and said subject into said audio message.

14. The method of claim 13, further comprising:

converting text included in a body of said electronic mail message into audio; and including said audio of said body text in said audio message.

15. The method of claim 13, further comprising:

including in said audio message an audio attachment to said electronic mail message.

16. A computer-implemented method of telephonically communicating a portion of an electronic mail message to a recipient, comprising:

receiving an electronic message;

retrieving a telephone number associated with an addressee of said electronic message;

wherein said addressee specifies preference settings on how and/or when determining the validity of said telephone number to ensure that said telephone number does not comprise one of predetermined specific numbers messages directed to said addressee's telephone number are or are not delivered;

generating an audio form of an identifier of an originator of said electronic message;

generating an audio form of a subject of said electronic message;

constructing an audio message to include:
  said audio form of said identifier;
  said audio form of said subject; and
  an audio attachment received with said electronic message;

establishing a telephone connection with said addressee according to said addressee's preference settings; and delivering said audio message through said telephone connection.

17. A computer readable storage medium storing instructions that, when executed by a computer, cause the computer to perform a method for converting text from an electronic message to audio for delivery via telephone, the method comprising:

receiving an electronic message containing text;

retrieving a telephone number associated with an addressee of said electronic message;

determining the validity of said telephone number to ensure that said telephone number does not comprise one of predetermined specific numbers wherein said addressee specifies preference settings on how and/or when messages directed to said addressee's telephone number are or are not delivered;

converting said text to audio;

establishing a telephone connection with said addressee according to said addressee's preference settings; and delivering said audio through said telephone connection.

18. An apparatus for converting text within an electronic message into audio for delivery via a telephone connection, comprising:

a message server configured to receive an electronic message from an originator, wherein an address to which said electronic message is directed is associated with a telephone number;

a rules module configured to apply a set of rules to determine whether said telephone number is valid by ensuring that said telephone number does not comprise any of: a restricted number, a toll free number, a directory assistance number, and an invalid area code;

a converter configured to convert a textual portion of said electronic message into an audio message; and a call processor configured to establish a telephonic connection with a telephonic device having said telephone number and play said audio message over said telephonic connection.

19. The apparatus of claim 18, wherein said address is not registered on said message server before said electronic message is received.

20. The apparatus of claim 18, wherein said converter is configured to convert a subject of said electronic message and an identity of said originator to audio.

21. The apparatus of claim 20, wherein said converter is further configured to convert to audio a textual portion of a body of said electronic message.

22. The apparatus of claim 18, wherein said call processor is further configured to include in said audio message an audio attachment to said electronic message.

* * * * *